US012182319B2

(12) United States Patent
Iyer et al.

(10) Patent No.: US 12,182,319 B2
(45) Date of Patent: Dec. 31, 2024

(54) SOFTWARE INITIATED CAMERA AND MICROPHONE INDICATOR

(71) Applicant: Apple Inc., Cupertino, CA (US)

(72) Inventors: Deepak Iyer, Santa Clara, CA (US); Jessica Aranda, Santa Clara, CA (US); Cindy M. Barrett, Portola Valley, CA (US); Patrick Coffman, Cupertino, CA (US); Julien Freudiger, San Francisco, CA (US); Alexander S. Haas, Cupertino, CA (US); Nahir A. Khan, San Francisco, CA (US); Behkish J. Manzari, San Francisco, CA (US); Kevin M. Miller, Underhill, VT (US); Brian Pietsch, Cupertino, CA (US); Stephen J. Rhee, San Jose, CA (US); Stefan Stuerke, San Jose, CA (US); Eric L. Wilson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/190,995

(22) Filed: Mar. 3, 2021

(65) Prior Publication Data

US 2021/0397751 A1    Dec. 23, 2021

Related U.S. Application Data

(60) Provisional application No. 63/041,795, filed on Jun. 19, 2020.

(51) Int. Cl.
*G06F 21/83* (2013.01)
*G06F 3/04817* (2022.01)
(Continued)

(52) U.S. Cl.
CPC .......... *G06F 21/83* (2013.01); *G06F 3/04817* (2013.01); *G06F 3/04842* (2013.01);
(Continued)

(58) Field of Classification Search
CPC ................... G06F 21/121; G06F 21/83; G06F 2221/2141; G06F 21/32; G06F 3/04842
See application file for complete search history.

(56) References Cited

U.S. PATENT DOCUMENTS

| 9,230,134 B1 | 1/2016 | Grigera |
| 9,578,160 B2 | 2/2017 | Kim et al. |

(Continued)

OTHER PUBLICATIONS

David Montesin, "CameraMicAlert", received from https://play.google.com/store/apps/details?id=com.davidmontesin.cameraalert&hl=en_US&gl=US, Updated Jan. 9, 2020, 3 pgs.

*Primary Examiner* — Andrea C Leggett
(74) *Attorney, Agent, or Firm* — BAKERHOSTETLER

(57) ABSTRACT

Embodiments described herein provide a software-based privacy indicator for a camera and microphone that focuses not purely on hardware status (e.g., on or off), but on whether potentially private data is flowing to the system or an application. If based purely on hardware status, the indicator for an electronic device may be shown in scenarios where no data actually flows to the system or applications. The privacy indicator will be enabled if any camera or microphone data is relayed to the operating system or an application that is executed via the operating system. When the device uses the microphone and camera to capture environmental metadata about the surroundings of the device without providing any audio samples, images, or video frames to the system or an application, the privacy indicator will not be enabled.

21 Claims, 13 Drawing Sheets

(51) Int. Cl.
*G06F 3/04842* (2022.01)
*G06F 21/12* (2013.01)
*G06F 21/32* (2013.01)

(52) U.S. Cl.
CPC ............ *G06F 21/121* (2013.01); *G06F 21/32* (2013.01); *G06F 2221/2141* (2013.01)

(56) References Cited

U.S. PATENT DOCUMENTS

| | | | |
|---|---|---|---|
| 9,699,217 | B2 | 7/2017 | Plagemann et al. |
| 2012/0222083 | A1* | 8/2012 | Vaha-Sipila ........ G06F 21/6245 726/1 |
| 2015/0350843 | A1* | 12/2015 | Jensen .................. H04W 4/024 455/456.3 |
| 2016/0226917 | A1* | 8/2016 | Plagemann ............ H04L 63/101 |
| 2018/0349008 | A1* | 12/2018 | Manzari ............... G06F 3/04847 |
| 2019/0325120 | A1* | 10/2019 | Fritzon .................... G10L 17/22 |
| 2021/0370879 | A1* | 12/2021 | Julian .................. B60R 25/257 |
| 2022/0377129 | A1* | 11/2022 | Julian .................... H04N 7/188 |

* cited by examiner

SOFTWARE INITIATED CAMERA AND MICROPHONE INDICATOR

CROSS-REFERENCE

This application claims the benefit of priority of U.S. Provisional Application No. 63/041,795 filed Jun. 19, 2020 which is incorporated herein by reference.

TECHNICAL FIELD

This disclosure relates generally to privacy controls on a mobile device. More specifically, this disclosure relates to a software initiated camera and microphone indicator.

BACKGROUND

A mandatory access control system in which any programmatic access to a resource is validated with the user to determine if the user actually intends to access that resource. This system can act as a defense against surreptitious access to a resource, where malicious software attempts to access hardware or data of a user's system without the user's knowledge. For example, an access control system can prevent an application from accessing a camera or microphone on a mobile device without explicit user permission. However, it would also be beneficial to have an indication of when an application that has been granted permission to use a camera or microphone is accessing such resource.

SUMMARY

Embodiments described herein provide a software initiated camera and microphone indicator for a computing device. When software on the computing device is configured to receive multimedia (e.g., audio, images, video, 3D scanner data, etc.) from a camera and/or microphone of the computing device, the multimedia subsystem can activate a software initiated camera and microphone indicator. The software initiated camera and microphone indicator can be rendered on a display of the computing device. However, when the camera and/or microphone of the electronic device is activated to gather environmental metadata in a manner that does not involve the receipt of multimedia data by software on the computing device, the indicator will not be displayed.

One embodiment provides an electronic device comprising a display device, a set of sensor devices including an audio sensor and an image sensor, one or more memory devices coupled with the set of sensor devices, and a set of processors coupled to the one or more memory devices. The set of processors include a sensor processor and an application processor, the set of processors to execute instructions stored on the one or more memory devices. The instructions to cause the set of processors to activate a sensor device to gather one or more of environment metadata data and multimedia data, enable display of a privacy indicator via the display device in response to a determination that the sensor device is activated to gather multimedia data to be transmitted to the set of processors, and disable the privacy indicator in response to a determination that the sensor is activated to only gather environment metadata.

One embodiment provides a non-transitory machine readable medium storing instructions which, when executed by one or more processors, cause the one or more processors of an electronic device to perform operations comprising activating a sensor device to gather one or more of environment metadata data and multimedia data, enabling display of a privacy indicator in response to a determination that the sensor device is activated to gather multimedia data to be transmitted to the one or more processors, and disabling the privacy indicator on the display device in response to a determination that the sensor is activated to only gather environment metadata.

One embodiment provides a data processing system comprising a display device, a memory device storing instructions, and one or more processors to execute the instructions. The instructions cause the one or more processors to perform operations comprising activating a sensor device to gather one or more of environment metadata data and multimedia data, enabling display of a privacy indicator in response to a determination that the sensor device is activated to gather multimedia data to be transmitted to the one or more processors, and disabling the privacy indicator on the display device in response to a determination that the sensor is activated to only gather environment metadata.

Other features of the present embodiments will be apparent from the accompanying drawings and from the Detailed Description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
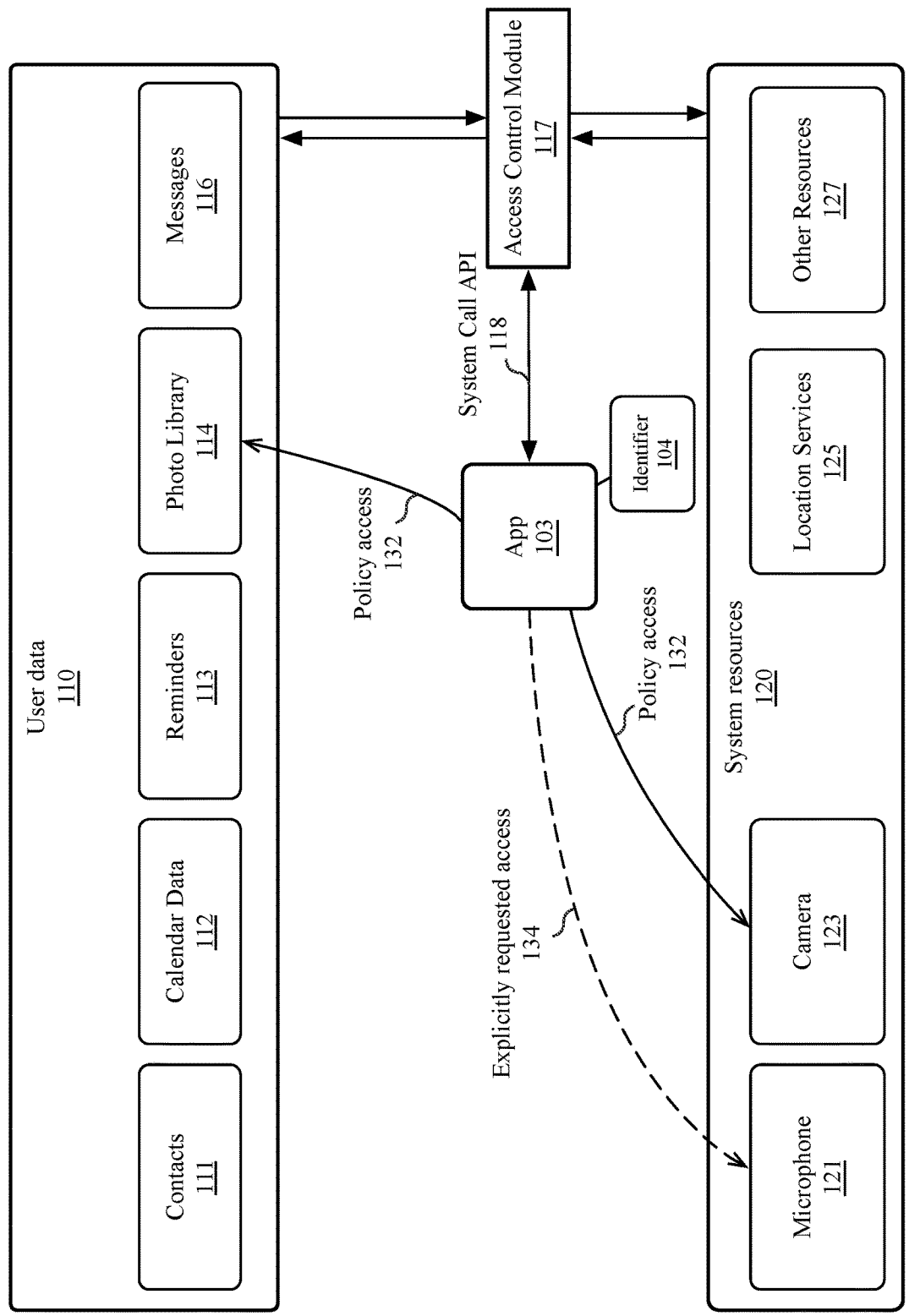
FIG. 1 illustrates an access control system for privacy sensitive data and hardware of a computing device.

Embodiments described herein provide techniques to enable a software initiated camera and microphone indicator for a computing device. The software-based camera and microphone in-use indicator is presented on a mobile electronic device (e.g., smartphone, tablet, wearable device) when the camera or microphone of the mobile electronic device is providing multimedia data to software. Such techniques may also be implemented on other electronic devices (e.g., laptop computers, desktop computers) instead of or in concert with hardware-based camera and microphone in-use indicators that may be presently in use on such devices. The software-based camera and microphone in-use indicator can work cooperatively with a privacy control system on the electronic device that controls application access to cameras and microphones of the electronic device. The privacy system is configured such that an application cannot access camera(s) or microphone(s) on a device without receiving explicit, runtime-granted permission from a user. Applications can request permission from the user to access such resources and the permission is persisted across application uses until or unless revoked by the user.

Embodiments described herein present a software camera and microphone indicator that indicates unambiguously to a user when audio or video/image data from a camera is being provided to either 1) the operating system, 2) first party applications, or 3) third party applications. The indicator can be presented, for example, in the form of a colored pixel region that is rendered on the display of the computing device or an icon that indicates the device that is in use and the application that is making use of the device. However, the indicator does not show for all activations of the camera or microphone. Specifically, the indicator does not show when the camera and microphone is activated only for the purposes of gathering environmental metadata, rather than audio samples, video frames, or camera images. When activated to gather environmental metadata, multimedia data captured from the camera(s) or microphone(s) are not stored to memory of the electronic device, and in some instances is not at all visible to applications that execute on an application processor of the electronic device. Thus, rather than being used as a hardware-based "in use" indicator that is shown whenever the camera or microphone hardware is in use, the privacy indicator can be used as an indicator of when software on an electronic device has access to data that may be captured via the camera(s) or microphone(s) on the electronic device.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, California.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2021, Apple Inc.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a system 100 in which access restrictions are imposed on applications, according to an embodiment. The system 100 includes user data 110 and system resources 120 that can be accessed by an application 103. In one embodiment, access to user data 110 and system resources 120 that are privacy sensitive is mediated by an access control module 117. User data 110 that is privacy sensitive can be grouped into different classifications including, but not limited to contacts 111, calendar data 112, reminders 113, a photo library 114, and messages 116, where the messages can include text (e.g., SMS) messages, email messages, and/or instant messages via an instant messaging application. System resources 120 that are privacy sensitive include but are not limited to a microphone 121, a camera 123, location services 125, and other resources 127, which can include software resources, hardware resources, or a combination thereof. Access to the user data 110 can be mediated on a per-classification level. Access to system resources 120 can be mediated on a per-resource level. Various additional types of privacy sensitive information can be protected by the system 100 as either a classification of user data 110 or system resources 120 that are classified as privacy sensitive, including but not limited to message history, web browser data (e.g., browser history, cookie data, etc.), system backup data, and any type of location history data that may be stored by the system 100.

In one embodiment, the access control module 117 is a system daemon through which an application 103 can communicate with via a system call API 118, such as an inter-process communication (IPC) call. The application includes an identifier 104 that is used to identify the application to the access control module 117. In one embodiment, the identifier 104 is a universally unique identifier. In one embodiment, the identifier 104 is unique per-system. In one embodiment the identifier 104 is unique per-user.

An application 103 can be provided access to a limited set of resources by default. This default access can be a policy-based access (e.g., policy access 132) that is granted to the application 103 based on the standard functionality of the application. For example, if application 103 is a camera application, the application 103 can be given policy access 132 to a camera 123 and photo library 114 based on a policy associated with the application 103. The system 100 can be configured to disallow access to privacy sensitive system resources by default, except for those to which the application 103 is granted policy access 132. In one embodiment, before the application 103 is granted access to user data 110 or system resources 120 outside of policy, the access control module 117 can trigger a graphical interface prompt by which a user of the system can explicitly grant or deny access to the classification of user data 110 or system resources 120. For example, before application 103 can access the contacts 111 of a user, the application 103 performs a call through the system call API 118 to the access control module 117 to explicitly request access 134 to the contacts 111. The user can then grant or deny access to the contacts 111.

Figure 2:
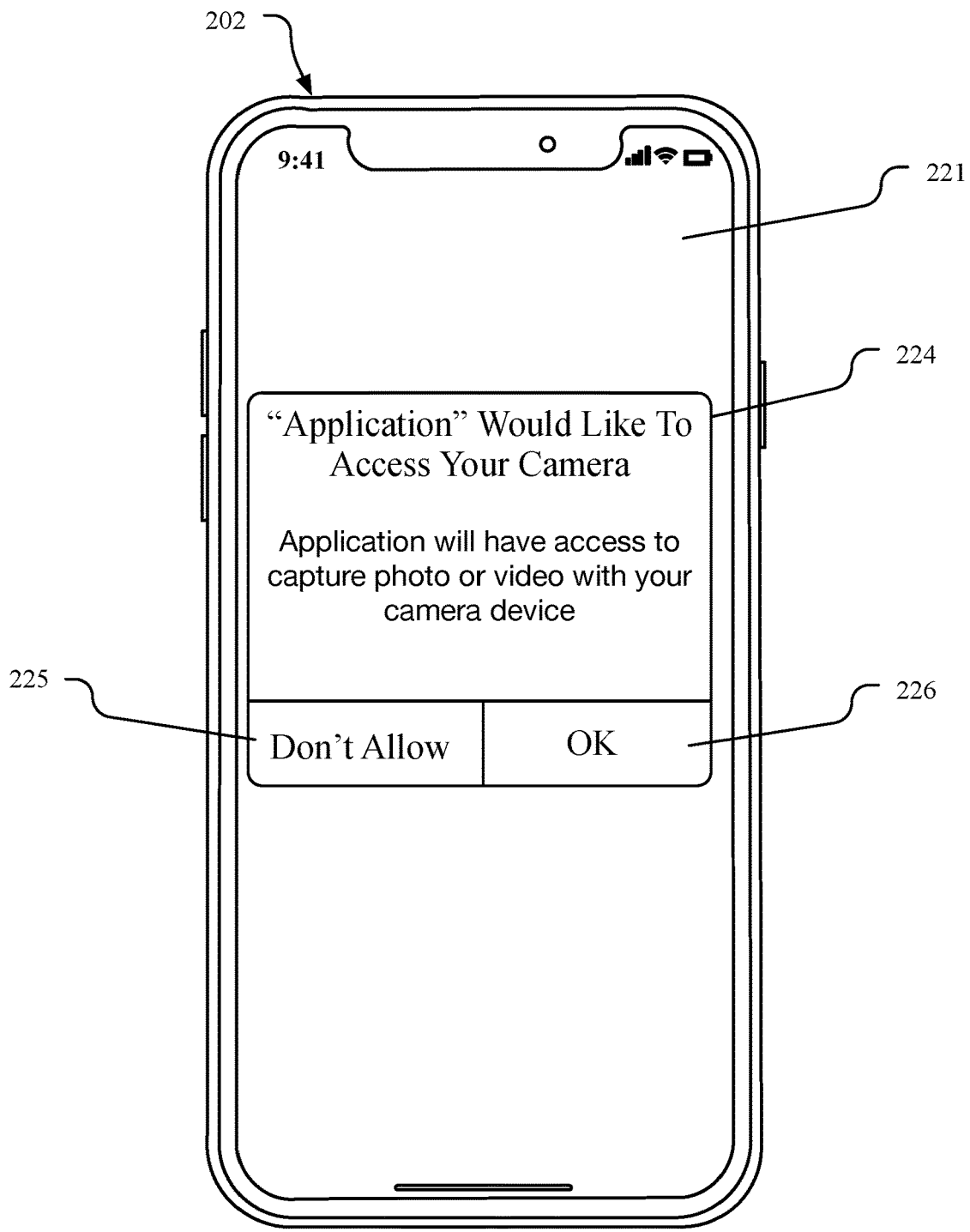
FIG. 2 illustrates an access control prompt for privacy sensitive hardware.

FIG. 2 illustrates a system 200 in which an access control prompt for privacy sensitive hardware is displayed on an electronic device 202. When an application is to access privacy sensitive hardware on the electronic device 202, such as a camera or microphone, the operating system can display a prompt 224 on a display 221 of the electronic device 202. As illustrated, the prompt 224 indicates that an application is requesting access to the camera on the electronic device. A first interface element 225 may be presented that enables the user to block ("don't allow") access to the camera. A second interface element 226 may be presented to allow ("OK") the application to access the camera. Once the application is granted access to the camera 123, the application can continue to access the camera unless the access is revoked. A similar prompt can be displayed in response to an attempt by an application to access the microphone of the user. In one embodiment, access to the camera and microphone is gated for all third-party applications that are executed on the electronic device 202. Access to the camera and microphone may also be gated for at least a subset of first-party applications. For example, first-party applications that do not have policy-based access based on the standard functionality of the application can trigger a prompt when those applications attempt to access the microphone or camera of the electronic device 202.

In one embodiment the software camera and microphone indicator is implemented via a window manager of the mobile device. In systems known in the art, a recording indicator is presented in the top left region of a display when an application is performing background recording. The software camera and microphone indicator described herein may be displayed without regard to foreground/background state of the application that has access to the camera and/or microphone data. Additionally, the status menu of the UI may be configured to identify which application is accessing data from which sensor.

The software camera and microphone indicator will not be displayed when the camera or microphone is used only to gather environmental metadata. When gathering only environmental metadata, audio or image data is not transmitted to the operating system or any applications. Instead, audio or image data is processed and only metadata resulting from that processing is transmitted to the operating system. In some instances, environmental metadata may be gathered and/or processed by a separate processor, such as a system processor, sensor processor, low power processor, secure processor and/or always-on processor, without providing any raw sensor data to the application processor. In some instances, environmental metadata may be processed while the application processor is in a low power state.

Environmental metadata includes an ambient sound or noise volume that is detectable by the microphone and whether the sound or noise volume is above a threshold. For example, the microphone on a device may be configured to sample only the volume of audio detected via the microphone and alert a user when the volume becomes potentially damaging to the hearing of the user. In an electronic device described herein, the software initiated camera and microphone indicator will not be displayed when the microphone is activated only for the purposes of capturing volume metadata.

Environmental metadata also includes whether a personal assistant activation trigger phrase has been spoken. For voice-activated virtual assistants (e.g., Siri), an activation phrase (e.g., "Hey Siri") is used to enable the use of the virtual assistant. The microphone of the system may be active without sending audio samples to the operating system. Instead a processor may be listening only for the activation phrase. Once the activation phrase is detected, audio samples from the microphone may be captured and stored in memory as input to the virtual assistant. In an electronic device described herein, the software initiated camera and microphone indicator will not be displayed when the microphone is activated only for the purposes of listening for a voice-activated virtual assistant activation phrase. The software initiated camera and microphone indicator will then be displayed in response to the beginning of transmission of audio data to the virtual assistant.

Environmental metadata also includes camera or image sensor metadata such as an ambient light level, user presence, user attention, or facial recognition-based device unlock. For example, one or more cameras or image sensors may be used to detect an ambient light level, which is then used to adjust screen brightness or perform color-space adjustments. A camera above or within a display of the may also be used to determine whether or not a user is facing the display or specifically whether the user is looking at the display and/or that the display has the user's attention. One or more cameras may also be used for facial recognition-based device unlock, such that the device may automatically unlock upon detecting the face of a specifically authorized user. The one or more cameras used for facial recognition-based device unlock can include a combination of a depth sensing camera, an infra-red camera, and/or a visible light camera. When one or more cameras or image sensors are used to determine metadata such as user-attention or when configured for facial recognition-based device unlock, the software initiated camera and microphone indicator will not be displayed. Analysis of such metadata may be performed by sensor processors, secure processors, or low-power processors of the system without providing any image or video data to the operating system or applications. The software initiated camera and microphone indicator may be displayed if the raw camera or image data that is gathered by the sensor processors, secure processors, or low-power processors of the system are made available to the operating system or an application.

The software camera and microphone indicator can be securely displayed via the window manager in a portion of the display that is not visible to and/or cannot be altered by an application executed by the device. The secure display of the software camera and microphone indicator is performed to prevent malicious applications from enabling camera or microphone recording and obscuring the camera and microphone indicator. Additionally, to prevent rapid cycling of the camera or microphone in attempt to micro-sample data, the camera and microphone indicator, once activated, will remain activated for at least a minimum period of time. The software camera and microphone indicator may be rendered by default by the window manager each frame and hidden by the window manager when the indicator will not be displayed. When the indicator is to be displayed, the window manager will bypass the hiding of the indicator for a frame in which the indicator is to be shown.

Figure 3:
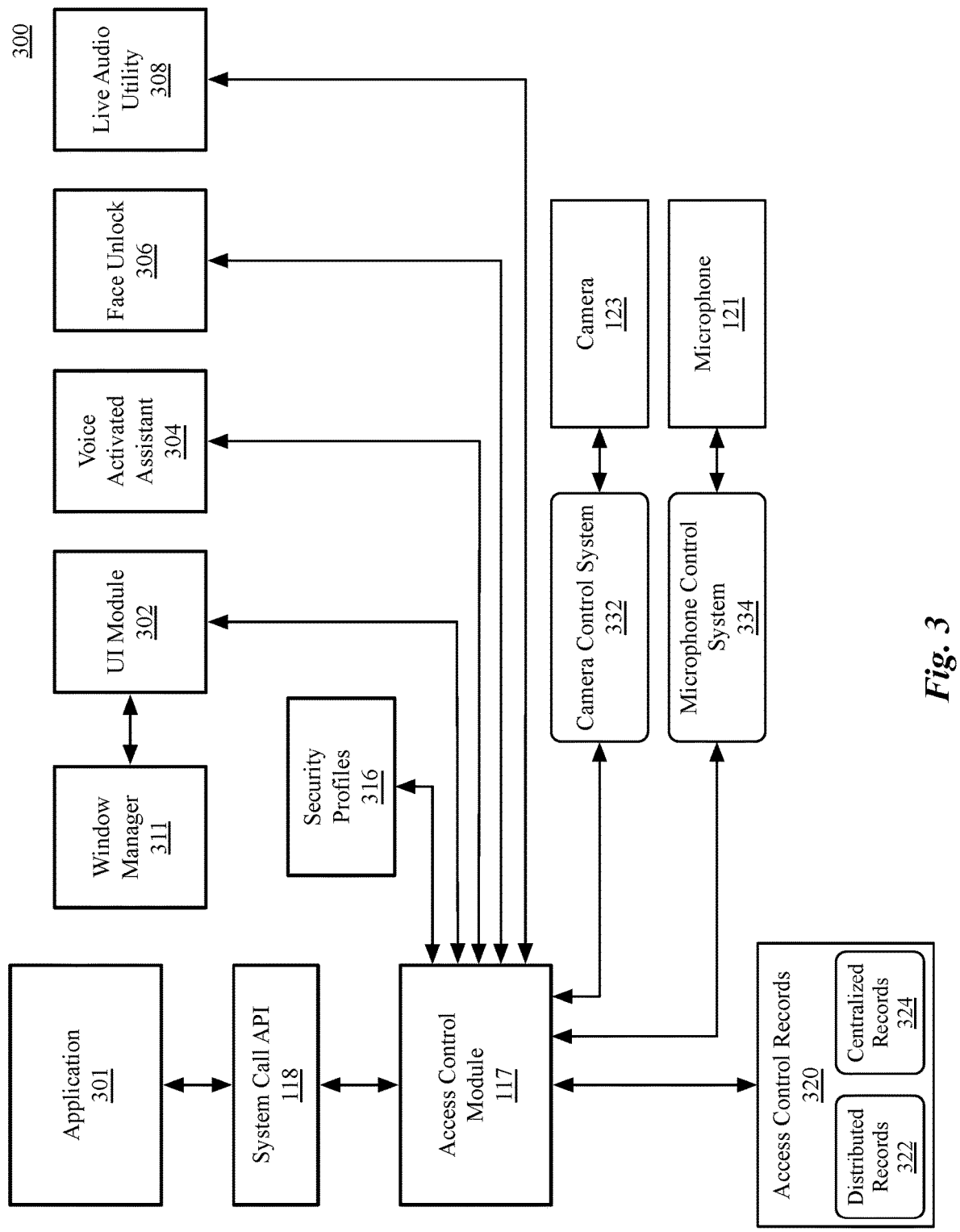
FIG. 3 is a block diagram illustrating an access control and indication system for a camera and microphone.

FIG. 3 is a block diagram illustrating a system 300 for operating a program in a restricted operating environment, according to an embodiment. The system 300 can represent software and hardware on a computing device, such as, but not limited to, a desktop, laptop, tablet computer, mobile phone (e.g., smartphone), wearable device, personal digital assistant (PDAs), media player, gaming device, television or television set-top box, smart appliance, and/or smart speaker device. Software components of the system 300 can be instructions that are executed by one or more processors (e.g., application processors, system processors, sensor processors, always-on processors, etc.) or firmware that is executed by one or more microcontrollers.

In one embodiment, software on the system 300 includes an application 301 that is communicatively coupled via the system call API 118 to the access control module 117. The application 301 can communicate via the system call API 118 to the access control module 117 to gain access to resources such as privacy sensitive user data or system resources (camera 123, microphone 121) that can be used to monitor a user or the environment around the computing device. Default access for certain resources can be provided to the application 301 via security profiles 316. A security profile for an application can be dynamically generated by compiling a set of one or more rules that specify resources to which an application can access.

Upon access by the application 301 to additional privacy sensitive resources that are not granted via the security profiles, the access control module 117 can trigger a UI module 302 to display a dialog prompt that requests a user to explicitly grant or deny access to a resource, such as prompt 224 of FIG. 2. A record of access status (grant, deny, read-only, etc.) can be recorded for the resource based on the response provided to the UI module 302. In some embodiments, the system 300 can maintain persistent access control records 320 that record access decisions on a per-user basis, with each user on the system having a separate record instance. In one embodiment the access control records 320 identify a resource for which the user has permitted or denied access, as well as the specific application or process that triggered the access request. In one embodiment, the access control records 320 can store an unknown status for some resources, which can indicate that no prompt results or rights delegation has been recorded for the resource.

In one embodiment the access control records 320 include distributed records 322 and centralized records 324. Distributed records 322 are used to persist access that was previously granted or denied to data files or folders. In one embodiment, distributed records 322 can be stored in extended file system data for files or folders containing user data. For distributed records 322, if a file or folder for which a record exists is deleted, in one embodiment the portion of the distributed records 322 associated with that file or folder can also be deleted. Centralized records 324 can be stored in a central database for each user and can be used specifically to record the results of an access request for a system resource, such as a microphone, camera, location services, and other privacy sensitive system resources.

The camera 123 and microphone 121 of the system 300 can be managed respectively, by a camera control system 332 and a microphone control system 334. The camera control system 332 and a microphone control system 334 can include drivers, utilities, and middleware that enable the operating system to operate the camera 123 and microphone 121 and facilitate the relay of multimedia and metadata captured by the camera 123 and microphone 121 to memory or connected devices. To access multimedia captured via the camera 123 and/or microphone 121, the application 301 can configure the camera control system 332 and/or microphone control system 334 to store audio, images, and/or video frames to memory that is accessible by the application 301. The multimedia may be captured by a sensor processor, platform processor, or peripherals processor that directly manages the camera 123 and microphone 121 and transmitted to the application processor, where the application processor stores the multimedia in memory associated with the application 301.

In one embodiment, each access by the application 301 is mediated by the access control module 117. In response to an access attempt, the access control module 117 can determine whether permission to access the camera 123 and/or microphone 121 is stored in the access control records 320 and allow the application 301 to access those resources when permission is indicated. When the application 301 will receive multimedia captured via the resources, the access control module 117 can request the UI module 302 to enable the camera and microphone indictor. The UI module 302 can then indicate to the window manager 311 that the camera and microphone indicator should be enabled.

To reduce the attack profile available to a malicious attacker, in one embodiment the software camera and microphone indicator is rendered by default by the window manager 311 for each frame and then hidden by the window manager when the indicator will not be displayed. When the indicator is to be displayed, the window manager will bypass the hiding of the indicator for a frame in which the indicator is to be shown. In one embodiment the software camera and microphone indicator are displayed via the window manager 311 in a portion of the display of the computing device that is not visible to and/or cannot be altered by the application 301. Additionally, to prevent rapid cycling of the camera 123 or microphone 121 in attempt to micro-sample data, the camera and microphone indicator, once activated, will remain activated for at least a minimum period of time.

The software initiated camera and microphone indicator provides an indication to the user of when privacy sensitive data may be captured by software on a computing device, but is not a simple indicator of the hardware status of the camera 123 and microphone 121. When the camera 123 and microphone 121 are activated, but multimedia data is not relayed to software on the electronic device, the camera and microphone indicator will remain hidden. In one embodiment, the determination of whether the status indicator is displayed is made based on whether the camera control system 332 and/or microphone control system 334 are configured to store multimedia data to memory that is accessible by the application 301 or by operating system software. This determination may be made by the access control module 117 and/or by other utilities or daemons within the system, such as a media server daemon that is responsible for vending media samples or frames to software on the system 300.

In one embodiment, the determination may be made based on whether multimedia data is received by the application processor upon which software of the system 300 executes, or any memory device that is associated with the application processor. For example, operating system software of the system 300, and in one embodiment, the application 301, may be configured to request environmental metadata. When environmental metadata is requested, only the metadata is transmitted, not the underlying multimedia data that is captured to determine the metadata. In one embodiment, at least a subset of elements of environmental metadata can be determined entirely by sensor processors, system processors, or secure processors, without requiring the underlying data to be passed into the domain of the application processor.

Environmental metadata may take various forms and be used for various purposes. In one embodiment, environmental metadata includes an ambient light level that may be determined in part via one or more sensors associated with the camera 123. In such embodiment, only the light level is transmitted to the system 300. Environmental metadata can also include an ambient audio level detected via the microphone 121. For example, a warning or alert may be issued to a user if the ambient audio level detected via the microphone becomes loud enough to potentially cause hearing damage to the user. In this instance, only the detected audio level, rather than any individual audio samples, are transmitted to the system 300.

Environmental metadata can also include whether an activation word for a voice activated virtual assistant 304 has been spoken. For example, the microphone 121 may be used by a system processor that listens only for a specific activation phrase and does not store any data received via the microphone 121. If the system processor detect that the activation phrase has been spoken, a signal or message may be sent to the application processor of the system 300, which can then activate the voice activated virtual assistant. In one embodiment, once the voice activated virtual assistant 304 begins receiving microphone data, the microphone indicator may be activated to indicate that audio data has become accessible to the system 300. In other embodiments, the indicator may continue to be suppressed when it is obvious to the user that the system is receiving audio. For computing devices that do not possess the system processor that is used to listen for the activation phrase, a system utility that executes on a low power core of the application processor may be used for such task. However, in such embodiment the captured audio samples are not retained by the system 300 and are immediately discarded once processed. As the audio is not persistently maintained by the system 300 and not made available to any applications on the system, an exception may be enabled for this particular scenario and the activation indicator may be suppressed. On other devices and in other instances, the indicator is displayed whenever multimedia data becomes available to any software on the system 300.

Environmental metadata can also include whether a user is recognized by a face-based locking or unlocking subsystem (e.g., face unlock subsystem 306). For example, the camera 123 may be a camera subsystem that includes one or more front-facing cameras. Those front-facing cameras can be used to recognize a registered user of the computing device. If the computing device is locked and the registered user is recognized by the face unlock subsystem 306, the computing device may be automatically unlocked. For this feature, metadata that indicates that the device may be unlocked is transmitted to the system 300. The captured images are processed by a system processor and/or secure processor, are not stored in memory that is accessible by software on the system 300, and may be discarded after processing.

The system 300 may also support an attention feature that is related to the face unlock subsystem 306. The attention feature can verify that the registered user is looking at the display before the system will be unlocked. The attention feature can also be used keep the display of the computing device at an active brightness level while the user is looking at the display. The display may be dimmed or powered off once the user is no longer looking at the display. When the attention feature is active, metadata that indicates whether the user is looking at the display is transmitted to the system, but the underlying image or video frames are not transmitted.

In one embodiment, environmental metadata may take the form of a live audio stream that is transmitted via a sensor processor and a wireless radio processor to a connected wireless audio device. In such embodiment, a live audio utility 308 can configure the system 300 such that audio data for the live audio stream may bypass the application processor and be streamed directly to a wireless audio device, such as a hearing aid, headphones, or earbuds. The audio data for the live audio stream may be inaccessible to software of the system 300.

Figure 4:
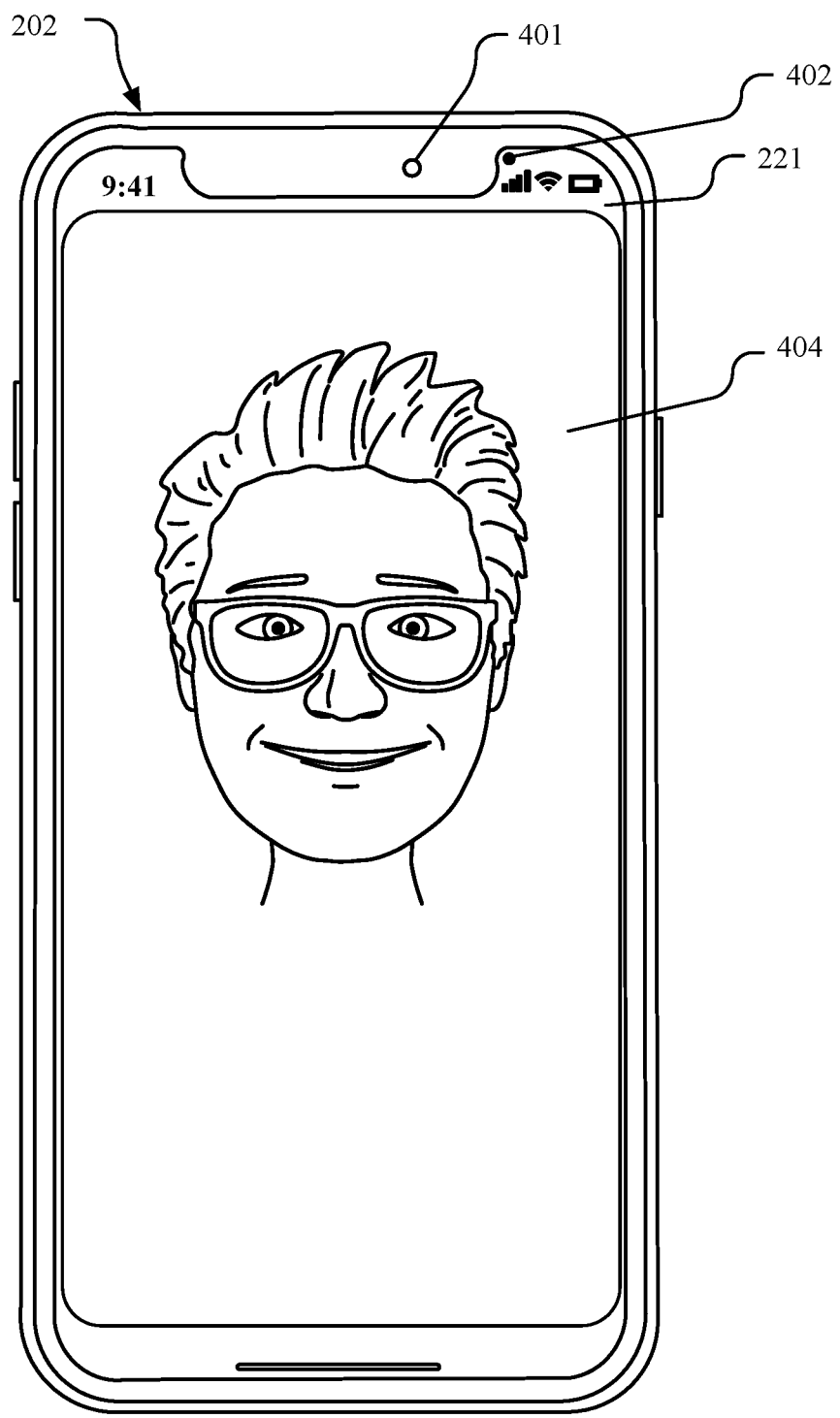
FIG. 4 illustrates a software initiated camera and microphone indicator for a mobile device.

FIG. 4 illustrates a software initiated camera and microphone indicator for a mobile device. As described herein, an electronic device 202 can display a software initiated camera and microphone indicator 402 on a portion of the display 221 of the electronic device. The software initiated camera and microphone indicator 402 can be displayed on a portion of the display that is not readable or writable by applications that execute on the electronic device 202. Instead, the indicator is rendered to a portion of the display that is managed by a window manager of the operating system of the electronic device. Thus, applications cannot spoof the indicator, or otherwise hide, occlude, or tamper with the indicator, in an attempt to allow surreptitious access to camera or microphone. The camera and microphone indicator 402 can be displayed whenever multimedia data that is captured by a camera or microphone of the electronic device 202. For example, when a user executes an application that uses a front facing camera 401 on the electronic device 202 to capture a self-portrait or capture video for a video chat, the camera and microphone indicator 402 can be illuminated by the window manager when rendering each frame of the user interface 404 presented via the display 221.

Figure 5A:
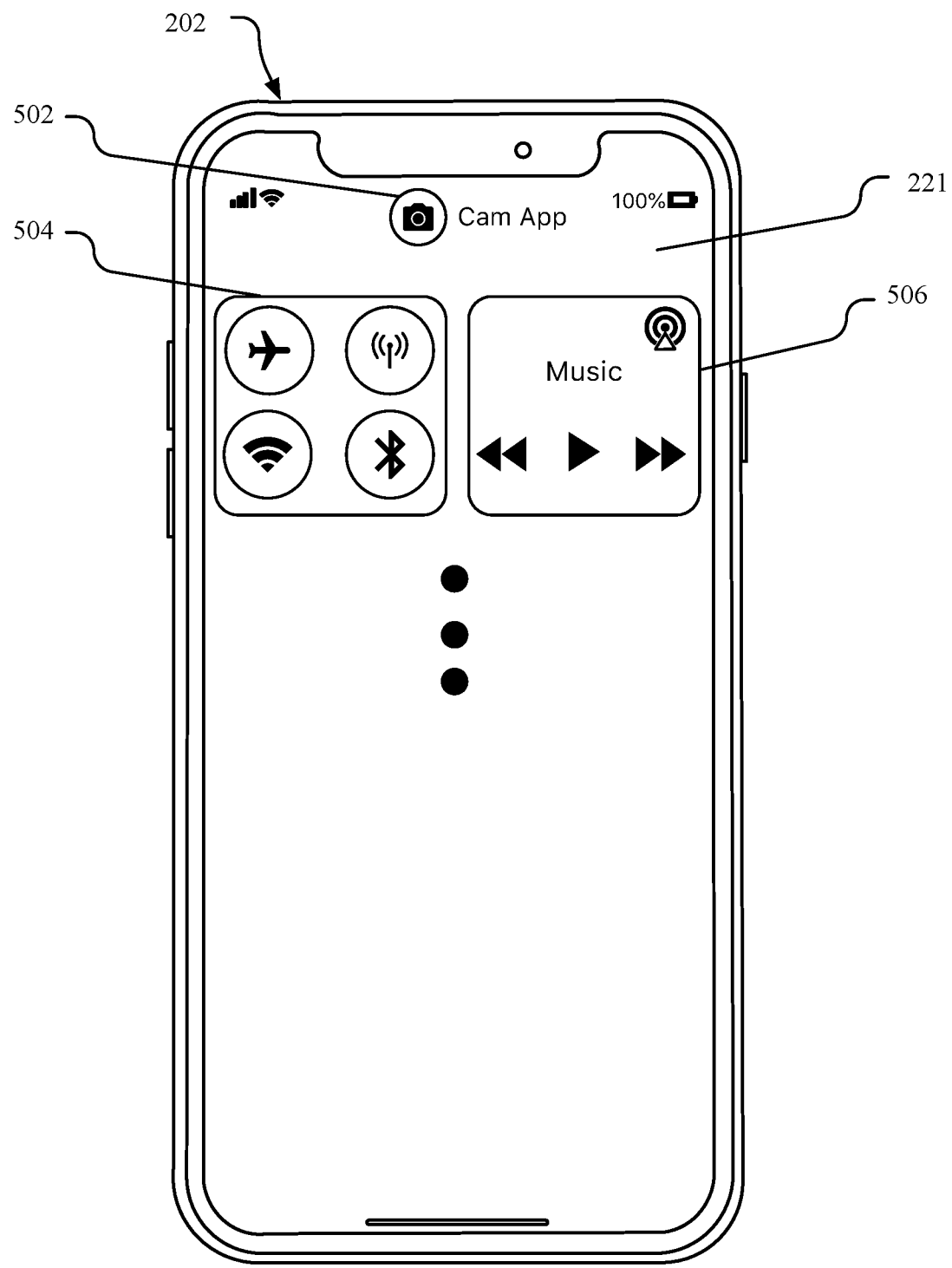
FIG. 5A-5B illustrates application identifying indicators for a camera and microphone.
Figure 5B:
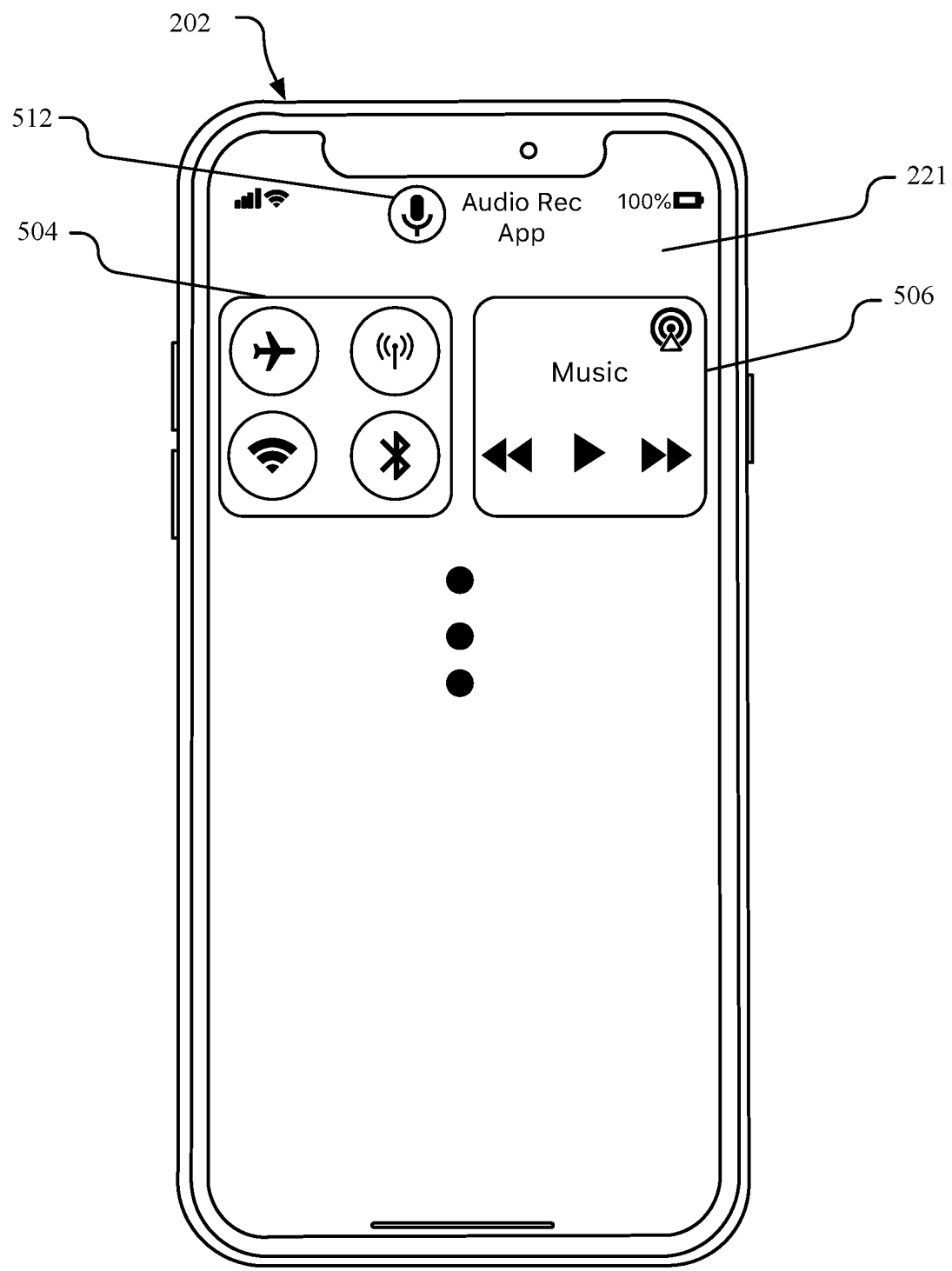

FIG. 5A-5B illustrates indicators that can be displayed on an electronic device 202 to identify applications that are making use of the camera and/or microphone. FIG. 5A illustrates an identifier 502 for a camera application that is configured to receive image or video data from a camera. FIG. 5B illustrates an identifier 512 for an audio recording application that is configured to receive audio data from a microphone. The identifiers 502, 512 can be displayed in a control center that is accessible via a gesture that is input via a touch interface that is presented on the display 221 of the electronic device 202. The identifiers 502, 512 can be presented to enable a user to identify the specific application that is receiving data from a camera or microphone of the electronic device 202. The identifiers 502, 512 can be presented in concert with other control center widgets, such as a wireless radio widget 504 and a media playback control widget 506.

Figure 6:
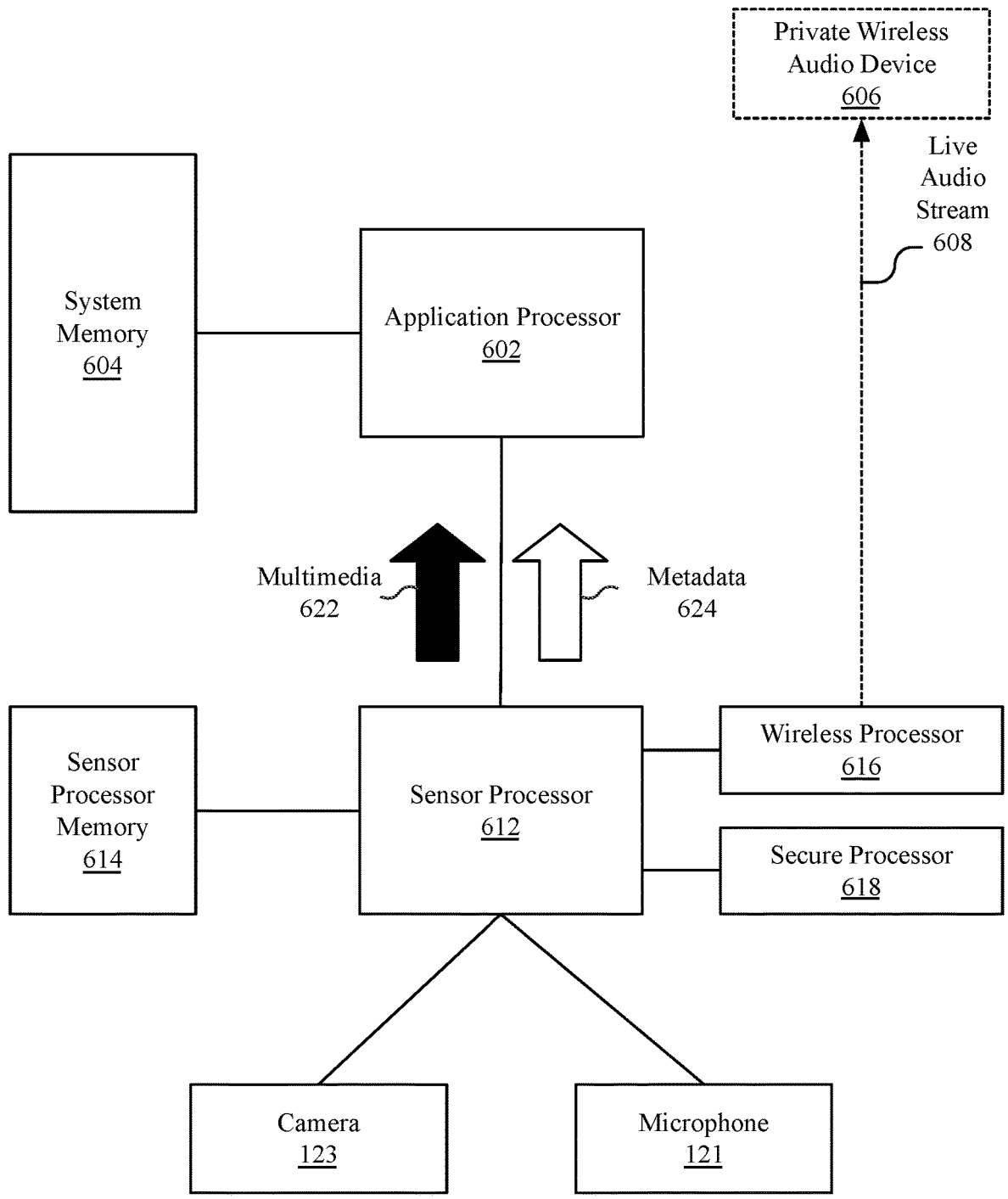
FIG. 6 is block diagram illustrating a system for displaying or suppressing a camera and microphone indicator.

FIG. 6 is block diagram illustrating a system 600 of hardware components that enable or suppress the display of a camera and microphone indicator for an electronic device. The system 600 illustrates hardware components that may be found in an electronic device as described herein (e.g., electronic device 202). The system 600 includes an application processor coupled with system memory 604. The application processor 602 also couples with a sensor processor 612. The sensor processor 612 can coupled with sensor processor memory 614. In one embodiment the sensor processor 612 is used to control the camera 123 and microphone 121.

In one embodiment, the software initiated camera and microphone indicator can be enabled whenever multimedia 622 (e.g., audio, images, video) is configured to be received at the application processor 602 and/or stored in system memory 604. The software can continue the suppression of the camera and microphone indicator when metadata 624 is transmitted to the application processor 602 and/or system memory 604 without a concurrent transmission multimedia 622. When metadata 624 is transmitted, values for the metadata can be determined by processing data from the camera 123 and microphone 121 using software or firmware logic that executes on the sensor processor. During the processing, the data from the camera 123 and microphone 121 may be stored in sensor processor memory 614. The data in the sensor processor memory 614 may be discarded after processing.

In one embodiment, some processing operations to determine metadata may be performed by a secure processor 618, such as a secure enclave processor. The secure processor 618 can be used to perform security sensitive operations, such as determining a facial recognition match for face unlock.

In one embodiment a connection between the sensor processor 612 and a private wireless audio device 606 (e.g., in-ear headphones, hearing aid, etc.) can be facilitated via a wireless processor 616. A live audio stream 608 from the microphone 121 can be transmitted to the private wireless audio device without traversing the application processor 602. As audio data is not transmitted to the application processor 602 or stored in system memory 604, transmission of the live audio stream directly to the private wireless audio device 606 may not trigger the camera and microphone indicator.

Figure 7A:
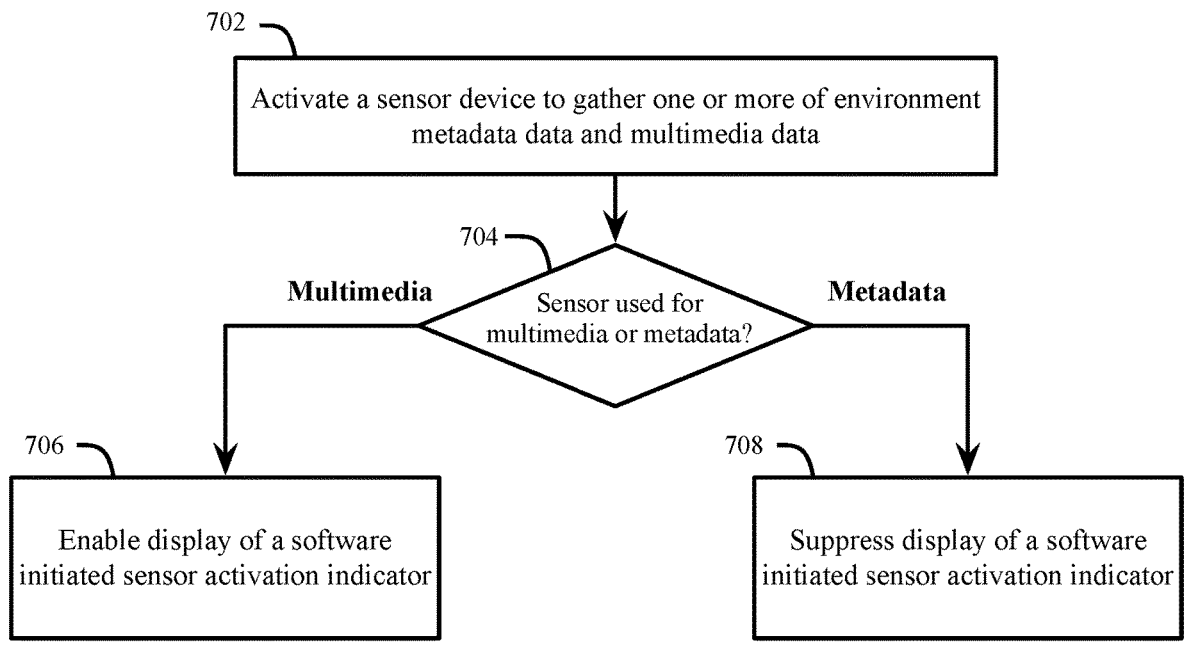
FIG. 7A-7B are flow diagrams illustrating methods to display or suppress and camera and microphone indicator.
Figure 7B:
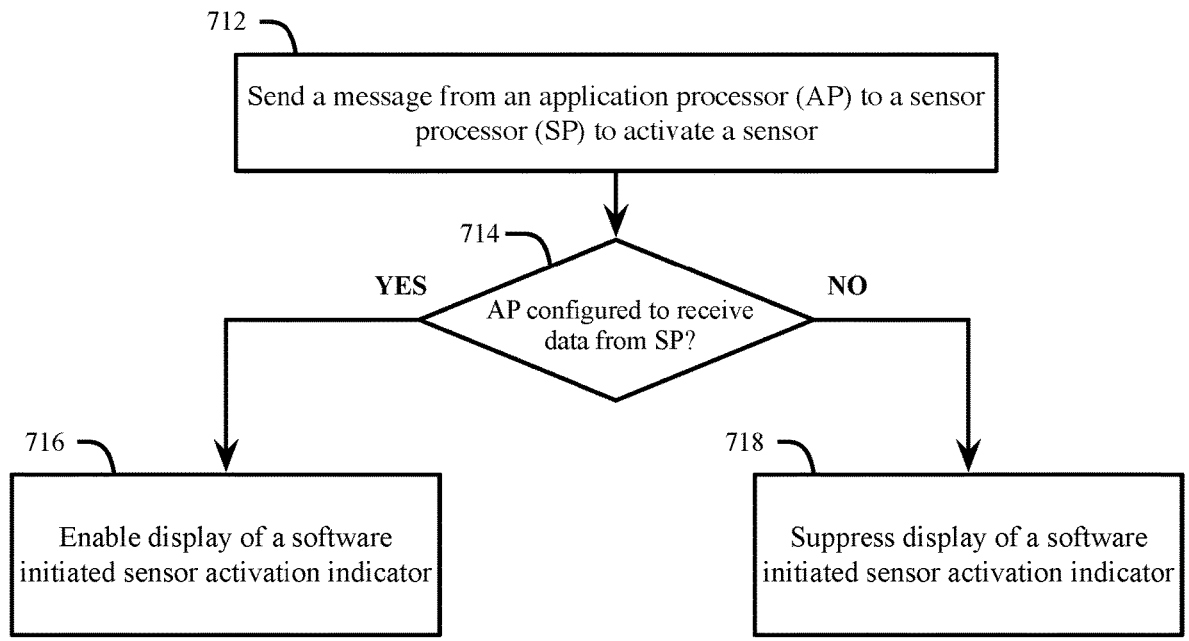

FIG. 7A-7B are flow diagrams illustrating methods to display or suppress and camera and microphone indicator. FIG. 7A illustrates a method 700 of determining whether to enable the software initiated sensor (e.g., camera and/or microphone) activation indicator based on whether the sensor is used for multimedia or metadata. FIG. 7B illustrates a method 710 of determining whether to enable the software initiated sensor (e.g., camera and/or microphone) activation indicator based on whether the application processor is configured to receive multimedia data from a sensor processor.

As shown in FIG. 7A, method 700 includes for logic on an electronic device to activate a sensor device to gather one or more of environment metadata data and multimedia data (702). The logic can then determine whether the sensor is to be used for multimedia or metadata (704). When the sensor is to be used for multimedia, the logic can enable display of a software initiated sensor activation indicator as described herein (706). To enable the display of the software initiated sensor activation indicator includes for the window manager on the electronic device to skip the hiding of the indicator for the frames in which the indicator is to be active. When the sensor is to be used only for metadata, the logic can suppress display of a software initiated sensor activation indicator as described herein (708).

As shown in FIG. 7B, method 710 includes for logic on an electronic device to send a message from an application processor (AP) to a sensor processor (SP) to activate a sensor (712). The logic can then determine whether the application processor, or memory associated therewith, is configured to receive data from the sensor processor (714). If the application processor and/or memory is to receive data from the sensor processor, the logic can enable display of a software initiated sensor activation indicator as described herein (716). When no data is received (e.g., only metadata is transmitted), then the logic can suppress display of a software initiated sensor activation indicator (718).

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g., the provider of a software library) or creator of the another set of APIs.

Figure 8:
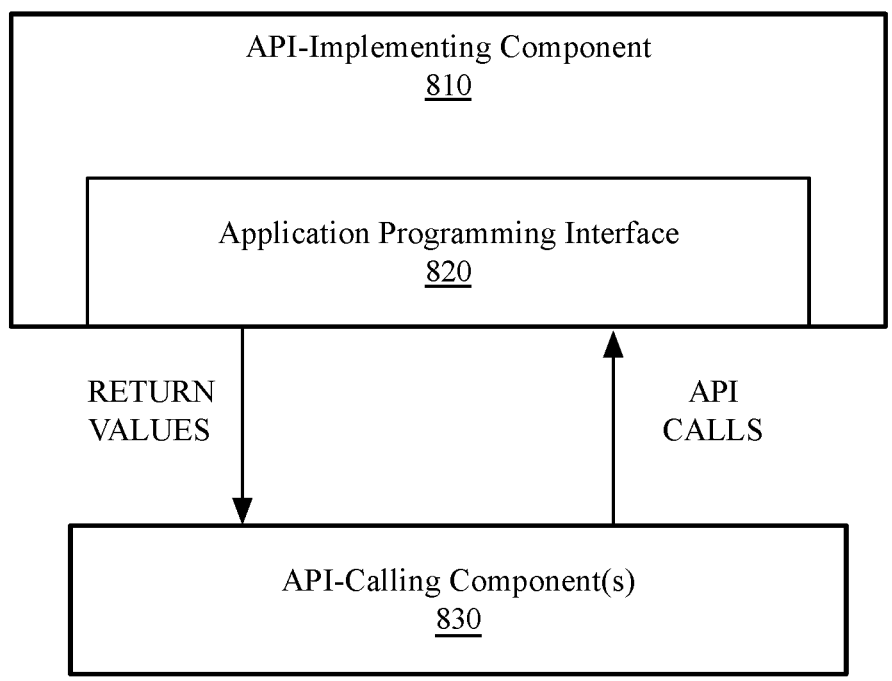
FIG. 8 is a block diagram illustrating an exemplary API architecture, which may be used in some embodiments of the invention.

FIG. 8 is a block diagram illustrating an exemplary API architecture, which may be used in some embodiments of the invention. As shown in FIG. 8, the API architecture 800 includes the API-implementing component 810 (e.g., an operating system, a library, a device driver, an API, an application program, software or other module) that implements the API 820. The API 820 specifies one or more functions, methods, classes, objects, protocols, data structures, formats and/or other features of the API-implementing component that may be used by the API-calling component 830. The API 820 can specify at least one calling convention that specifies how a function in the API-implementing component receives parameters from the API-calling component and how the function returns a result to the API-calling component. The API-calling component 830 (e.g., an operating system, a library, a device driver, an API, an application program, software or other module), makes API calls through the API 820 to access and use the features of the API-implementing component 810 that are specified by the API 820. The API-implementing component 810 may return a value through the API 820 to the API-calling component 830 in response to an API call.

It will be appreciated that the API-implementing component 810 may include additional functions, methods, classes, data structures, and/or other features that are not specified through the API 820 and are not available to the API-calling component 830. It should be understood that the API-calling component 830 may be on the same system as the API-implementing component 810 or may be located remotely and accesses the API-implementing component 810 using the API 820 over a network. While FIG. 8 illustrates a single API-calling component 830 interacting with the API 820, it should be understood that other API-calling components, which may be written in different languages (or the same language) than the API-calling component 830, may use the API 820.

The API-implementing component 810, the API 820, and the API-calling component 830 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 9A:
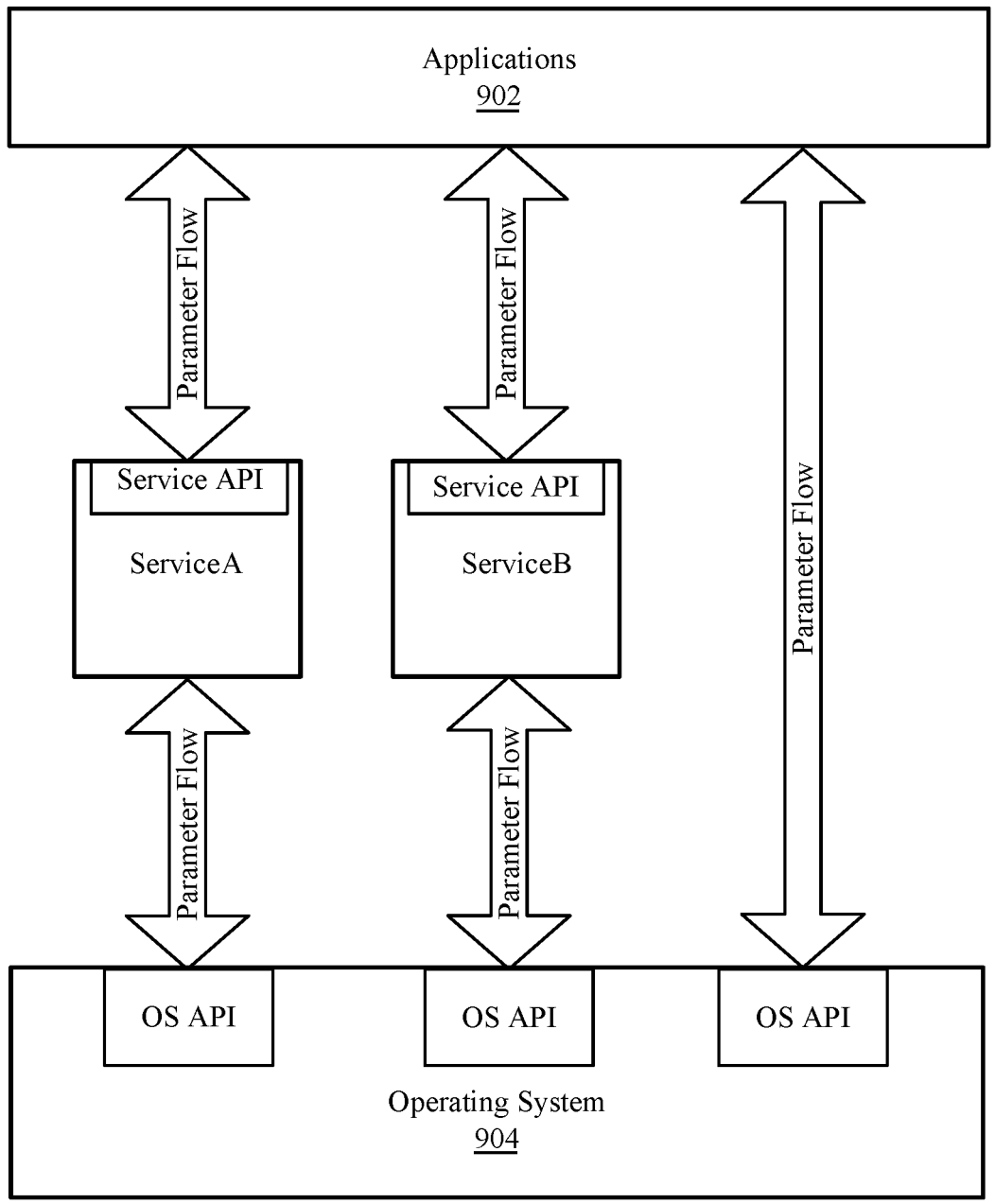
FIG. 9A-9B are block diagrams of exemplary API software stacks, according to embodiments.
Figure 9B:
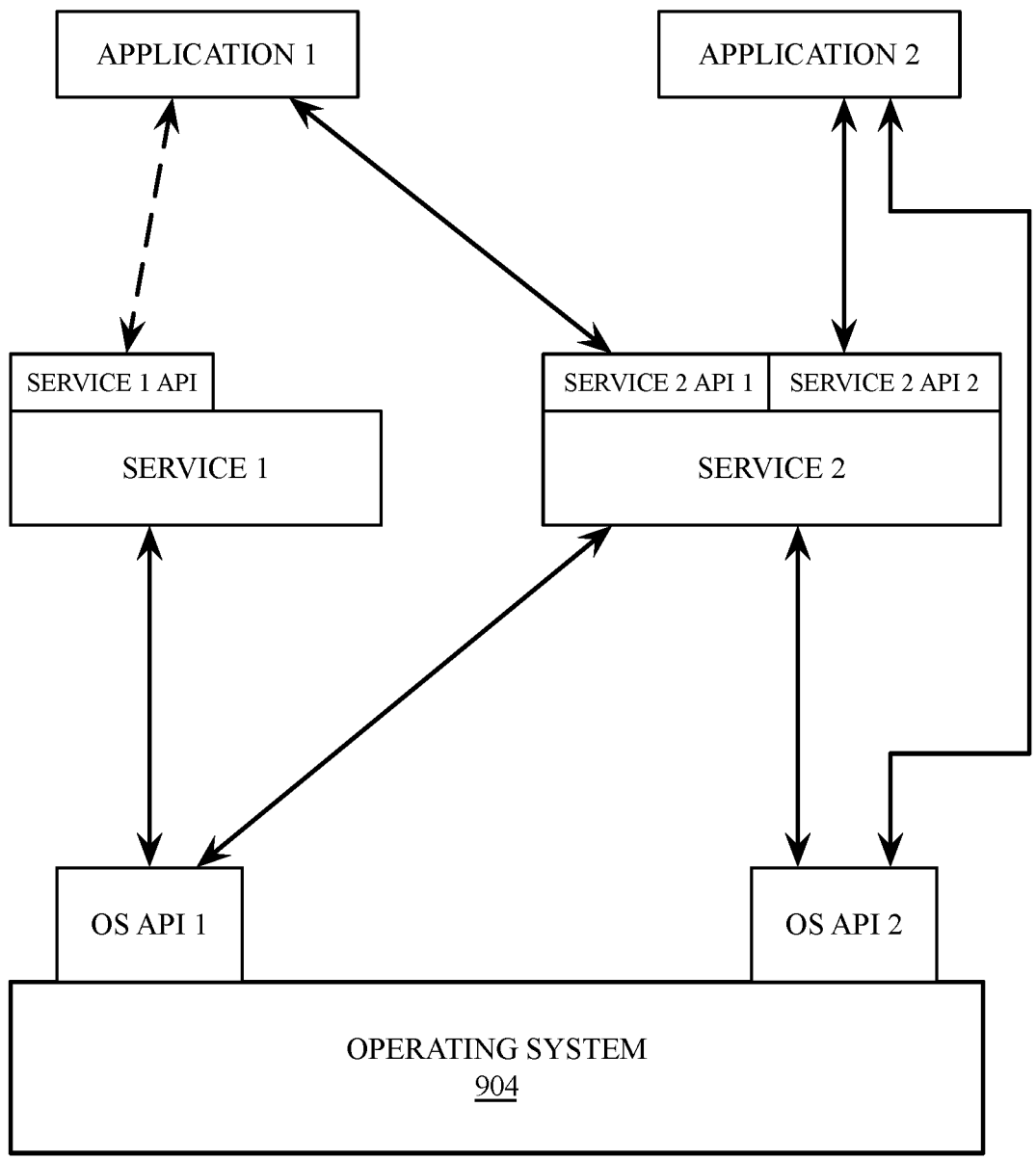

FIG. 9A-9B are block diagrams of exemplary API software stacks 900, 910, according to embodiments. FIG. 9A shows an exemplary API software stack 900 in which applications 902 can make calls to Service A or Service B using Service API and to Operating System 904 using an OS API. Additionally, Service A and Service B can make calls to Operating System 904 using several OS APIs.

FIG. 9B shows an exemplary API software stack 910 including Application 1, Application 2, Service 1, Service 2, and Operating System 904. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 10:
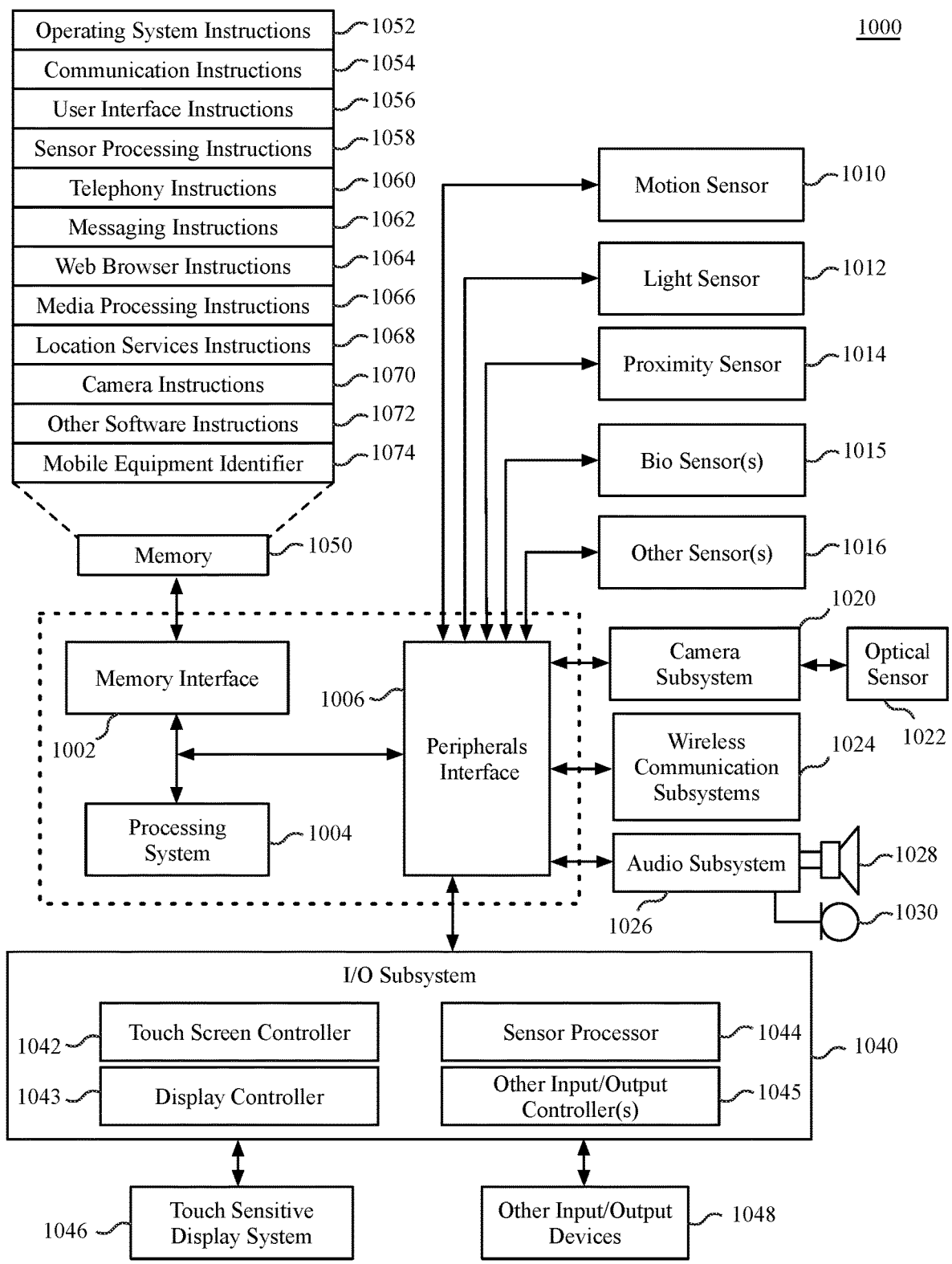
FIG. 10 is a block diagram of a device architecture for a mobile or embedded device, according to an embodiment.

FIG. 10 is a block diagram of a device architecture 1000 for a mobile or embedded device, according to an embodiment. The device architecture 1000 includes a memory interface 1002, a processing system 1004 including one or more data processors, image processors and/or graphics processing units, and a peripherals interface 1006. The various components can be coupled by one or more communication buses or signal lines. The various components can be separate logical components or devices or can be integrated in one or more integrated circuits, such as in a system on a chip integrated circuit.

The memory interface 1002 can be coupled to memory 1050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the mobile device functionality. One or more biometric sensor(s) 1015 may also be present, such as a fingerprint scanner for fingerprint recognition or an image sensor for facial recognition. Other sensors 1016 can also be connected to the peripherals interface 1006, such as a positioning system (e.g., GPS receiver), a temperature sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the wireless communication subsystems 1024 can depend on the communication network(s) over which a mobile device is intended to operate. For example, a mobile device including the illustrated device architecture 1000 can include wireless communication subsystems 1024 designed to operate over a GSM network, a CDMA network, an LTE network, a Wi-Fi network, a Bluetooth network, or any other wireless network. In particular, the wireless communication subsystems 1024 can provide a communications mechanism over which a media playback application can retrieve resources from a remote media server or scheduled events from a remote calendar or event server.

An audio subsystem 1026 can be coupled to a speaker 1028 and a microphone 1030 to facilitate voice-enabled functions, such as voice recognition, voice replication, digital recording, and telephony functions. In smart media devices described herein, the audio subsystem 1026 can be a high-quality audio subsystem including support for virtual surround sound.

The I/O subsystem 1040 can include a touch screen controller 1042 and/or other input controller(s) 1045. For computing devices including a display device, the touch screen controller 1042 can be coupled to a touch sensitive display system 1046 (e.g., touch-screen). The touch sensitive display system 1046 and touch screen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment, the display controller 1043 can provide frame data to the touch sensitive display system 1046 at a variable frame rate.

In one embodiment, a sensor processor 1044 is included to monitor, control, and/or processes data received from one or more of the motion sensor 1010, light sensor 1012, proximity sensor 1014, or other sensors 1016. The sensor processor 1044 can include logic to interpret sensor data to determine the occurrence of one of more motion events or activities by analysis of the sensor data from the sensors. In one embodiment the sensor processor 1044 also manages the camera subsystem 1020 and audio subsystem 1026, which couples with the sensor processor 1044 via the peripherals interface 1006. Multimedia captured by the camera subsystem 1020 and/or audio subsystem 1026 may be relayed to the memory 1050 to be accessed by software executing on the processing system 1004, or processed by the sensor processor 1044 or other processors in the system to determine environmental metadata. In one embodiment, the sensor processor may configure a live audio stream to a hearing-aid device or wireless earbuds that are connected via a wireless processor, enabling the audio stream to bypass the processing system 1004 and memory 1050.

In one embodiment, the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or location services instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identifier (IMEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

Figure 11:
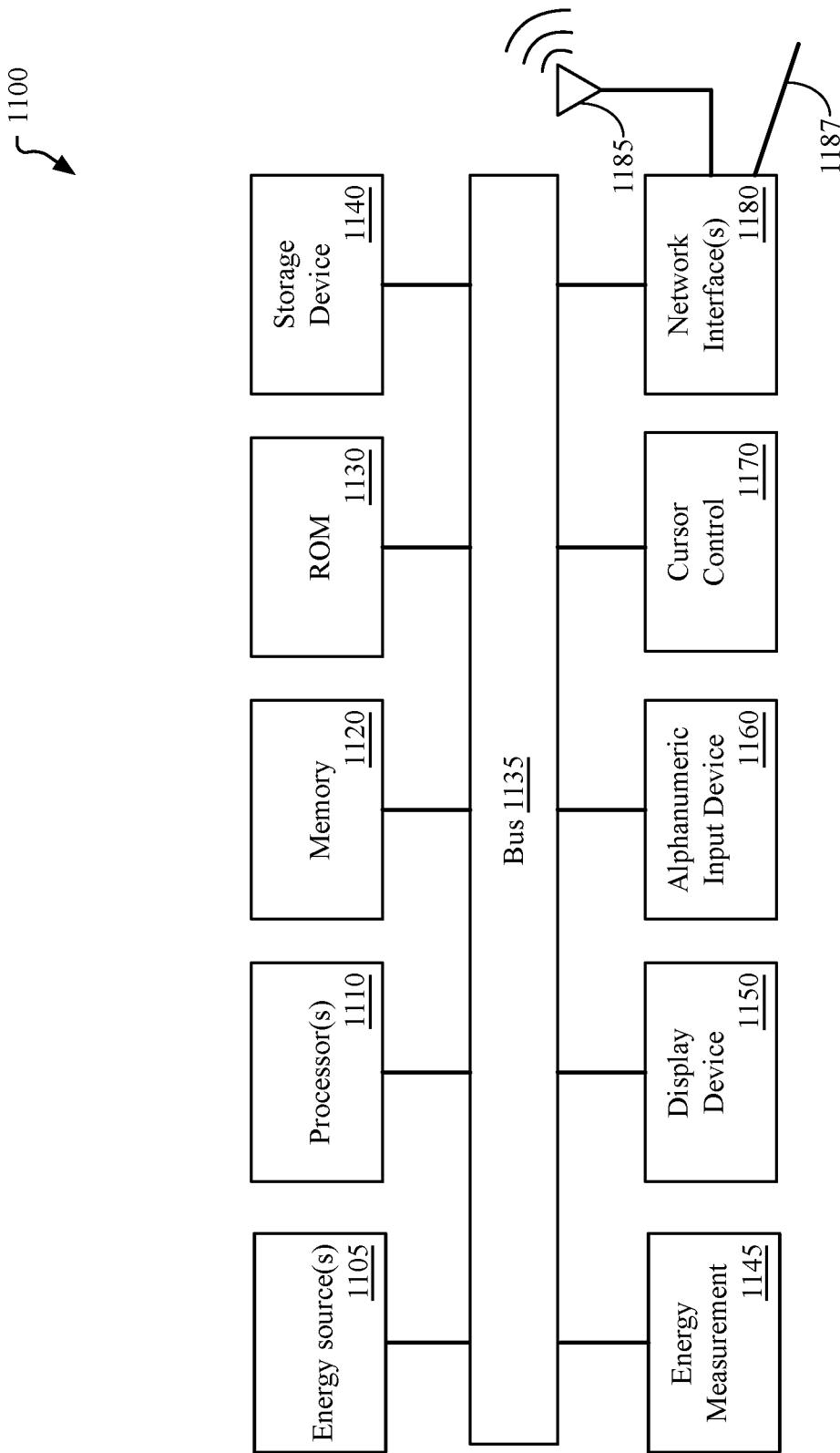
FIG. 11 is a block diagram of a computing system, according to an embodiment.

FIG. 11 is a block diagram of a computing system 1100, according to an embodiment. The illustrated computing system 1100 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1100 can be used to provide the computing device and/or a server device to which the computing device may connect.

The computing system 1100 includes bus 1135 or other communication device to communicate information, and processor(s) 1110 coupled to bus 1135 that may process information. While the computing system 1100 is illustrated with a single processor, the computing system 1100 may include multiple processors and/or co-processors. The computing system 1100 further may include memory 1120, which can be random access memory (RAM) or other dynamic storage device coupled to the bus 1135. The memory 1120 may store information and instructions that may be executed by processor(s) 1110. The memory 1120 may also be used to store temporary variables or other intermediate information during execution of instructions by the processor(s) 1110.

The computing system 1100 may also include read only memory (ROM) 1130 and/or another data storage device 1140 coupled to the bus 1135 that may store information and instructions for the processor(s) 1110. The data storage device 1140 can be or include a variety of storage devices, such as a flash memory device, a magnetic disk, or an optical disc and may be coupled to computing system 1100 via the bus 1135 or via a remote peripheral interface.

The computing system 1100 may also be coupled, via the bus 1135, to a display device 1150 to display information to a user. The computing system 1100 can also include an alphanumeric input device 1160, including alphanumeric and other keys, which may be coupled to bus 1135 to communicate information and command selections to processor(s) 1110. Another type of user input device includes a cursor control 1170 device, such as a touchpad, a mouse, a trackball, or cursor direction keys to communicate direction information and command selections to processor(s) 1110 and to control cursor movement on the display device 1150. The computing system 1100 may also receive user input from a remote device that is communicatively coupled via one or more network interface(s) 1180.

The computing system 1100 further may include one or more network interface(s) 1180 to provide access to a network, such as a local area network. The network interface(s) 1180 may include, for example, a wireless network interface having antenna 1185, which may represent one or more antenna(e). The computing system 1100 can include multiple wireless network interfaces such as a combination of Wi-Fi, Bluetooth®, near field communication (NFC), and/or cellular telephony interfaces. The network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, the network interface(s) 1180 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1100 can further include one or more energy sources 1105 and one or more energy measurement systems 1145. Energy sources 1105 can include an AC/DC adapter coupled to an external power source, one or more batteries, one or more charge storage devices, a USB charger, or other energy source. Energy measurement systems include at least one voltage or amperage measuring device that can measure energy consumed by the computing system 1100 during a predetermined period of time. Additionally, one or more energy measurement systems can be included that measure, e.g., energy consumed by a display device, cooling subsystem, Wi-Fi subsystem, or other frequently used or high-energy consumption subsystem.

As described above, one aspect of the present technology is the gathering and use of data available from specific and legitimate sources to improve user experience with respect to granting access to protected resources on a data processing system. The present disclosure contemplates that in some instances, this gathered data may include personal information data regarding application usage patterns for a user. The gathering of such application usage patterns may also inadvertently reveal other information that may be used to uniquely identify the user, such as demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users, for example, to improve the user experience with performing tasks using a data processing system or computing device described herein.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during system configuration or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide a software-based privacy indicator for a camera and microphone that focuses not purely on hardware status (e.g., on or off), but on whether potentially private data is flowing to the system or an application. If based purely on hardware status, the indicator for an electronic device may be shown in scenarios where no data actually flows to the system or applications. The privacy indicator will be enabled if any camera or microphone data is relayed to the operating system or an application that is executed via the operating system. When the device uses the microphone and camera to capture environmental metadata about the surroundings of the device without providing any audio samples, images, or video frames to the system or an application, the privacy indicator will not be enabled.

One embodiment provides an electronic device comprising a display device, a set of sensor devices including an audio sensor and an image sensor, one or more memory devices coupled with the set of sensor devices, and a set of processors coupled to the one or more memory devices. The set of processors include a sensor processor and an application processor, the set of processors to execute instructions stored on the one or more memory devices. The instructions to cause the set of processors to activate a sensor device to gather one or more of environment metadata data and multimedia data, enable display of a software initiated sensor activation indicator via the display device in response to a determination that the sensor device is activated to gather multimedia data to be transmitted to the set of processors, and disable and/or suppress display of the software initiated sensor activation indicator on the display device in response to a determination that the sensor is activated to only gather environment metadata.

One embodiment provides a non-transitory machine readable medium storing instructions which, when executed by one or more processors, cause the one or more processors of an electronic device to perform operations comprising activating a sensor device to gather one or more of environment metadata data and multimedia data, enabling display of a software initiated sensor activation indicator via a display of the electronic device in response to a determination that the sensor device is activated to gather multimedia data to be transmitted to the one or more processors, and disabling and/or suppressing display of the software initiated sensor activation indicator on the display device in response to a determination that the sensor is activated to only gather environment metadata.

One embodiment provides a data processing system comprising a display device, a memory device storing instructions, and one or more processors to execute the instructions. The instructions cause the one or more processors to perform operations comprising activating a sensor device to gather one or more of environment metadata data and multimedia data, enabling display of a software initiated sensor activation indicator via the display device in response to a determination that the sensor device is activated to gather multimedia data to be transmitted to the set of processors, and disabling and/or suppressing display of the software initiated sensor activation indicator on the display device in response to a determination that the sensor is activated to only gather environment metadata.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An electronic device comprising:
    a display device;
    a set of sensor devices including an audio sensor and an image sensor;
    one or more memory devices coupled with the set of sensor devices; and
    a set of processors coupled to the one or more memory devices, the set of processors including a secure processor and an application processor, the set of processors to execute instructions stored on the one or more memory devices, the instructions to cause the set of processors to:
        activate a sensor device to gather one or more of a first type of data or a second type of data for processing at the electronic device, the second type of data being different than the first type of data;
        automatically enable display of a privacy indicator in response to a determination that the sensor device is activated to gather the second type of data to be transmitted to at least one of the secure processor or the application processor; and
        automatically disable the display of the privacy indicator in response to a determination that the sensor device is activated to only gather the first type of data to be transmitted to only the secure processor.

2. The electronic device as in claim 1, wherein to enable display of the privacy indicator includes to display the privacy indicator for at least a minimum period of time in response to determination that the sensor device is to be activated to gather multimedia data.

3. The electronic device as in claim 1, wherein the first type of data indicates whether an ambient sound level is above a threshold.

4. The electronic device as in claim 1, wherein the first type of data indicates whether a virtual assistant activation trigger is detected.

5. The electronic device as in claim 1, wherein the first type of data indicates whether a specific user is facing the display device.

6. The electronic device as in claim 1, wherein the secure processor is configured to process the first type of data at the electronic device without providing sensor data to the application processor and the application processor is configured to process the second type of data at the electronic device.

7. The electronic device as in claim 1, wherein the privacy indicator is a software initiated sensor activation indicator that is displayed via the display device and to enable display of the privacy indicator includes to:
    render the privacy indicator by default within a frame to be displayed via the display device;
    enable display the privacy indicator in response to the determination that the sensor device is activated to gather multimedia data to be transmitted to the set of processors;
    prevent occlusion or tampering of the sensor activation indicator by an application executed by the application processor; and
    suppress display of the privacy indicator in response to the determination that the sensor device is activated to only gather the first type of data.

8. The electronic device as in claim 1, wherein the secure processor is to receive a message to activate the sensor device from the application processor and activate the sensor device in response to the message.

9. The electronic device as in claim 8, wherein the secure processor is to activate the sensor device to gather the first type of data and process the first type of data without providing sensor data to the application processor.

10. The electronic device as in claim 9, wherein the secure processor is to activate the sensor device to gather the first type of data while the application processor is in a low power state.

11. The electronic device as in claim 1, wherein the electronic device is a smartphone, tablet computing device, or a wearable electronic device.

12. A non-transitory machine readable medium storing instructions which, when executed by one or more processors of an electronic device, cause the one or more processors of the electronic device to perform operations comprising:
    activating a sensor device to gather one or more of environment metadata or multimedia data;
    automatically enabling a privacy indicator in response to a determination that the sensor device is activated to gather the multimedia data to be transmitted to an application processor of the one or more processors; and
    automatically disabling the privacy indicator in response to a determination that the sensor device is activated to only gather the environment metadata exclusive of the multimedia data to be transmitted to a secure processor of the one or more processors and not the application processor of the one or more processors.

13. The non-transitory machine readable medium as in claim 12, wherein enabling the privacy indicator includes displaying the privacy indicator for at least a minimum period of time in response determining that the sensor device is to be activated to gather multimedia data, wherein the privacy indicator is a software initiated sensor activation indicator that is displayed via a display device.

14. The non-transitory machine readable medium as in claim 12, wherein the environment metadata includes whether an ambient sound level is above a threshold.

15. The non-transitory machine readable medium as in claim 12, wherein the environment metadata includes whether a user is facing a display device.

16. The non-transitory machine readable medium as in claim 15, wherein the environment metadata includes whether a specific user is facing a display device.

17. The non-transitory machine readable medium of claim 12, wherein the operations further comprise:
    automatically disabling display of the privacy indicator in response to a determination that the sensor device is activated to gather the multimedia data to be transmitted to only the secure processor exclusive of the application processor.

18. A data processing system within a device, the data processing system comprising:
    a display device;
    a memory device storing instructions; and
    one or more processors to execute the instructions, wherein the instructions cause the one or more processors to perform operations comprising:
        activating a sensor device to gather one or more of environment metadata or multimedia data;
        automatically enabling a privacy indicator in response to a determination that the sensor device is activated to gather the multimedia data for processing by a secure processor or an application processor of the one or more processors of the data processing system; and
        automatically disabling the privacy indicator in response to a determination that the sensor device is activated to only gather the multimedia data for processing by the secure processor and not the application processor of the data processing system.

19. The data processing system as in claim 18, wherein enabling display of the privacy indicator includes displaying the privacy indicator for at least a minimum period of time in response determining that the sensor device is to be activated to gather multimedia data, wherein the privacy indicator is a software initiated sensor activation indicator that is displayed via the display device.

20. The data processing system as in claim 18, wherein the environment metadata includes whether an ambient sound level is above a threshold, whether a user is facing the display device, or whether a specific user is facing the display device.

21. The data processing system as in claim 18, wherein the secure processor is to activate the sensor device to gather environment metadata, and process the environment metadata without providing sensor data to the application processor.

* * * * *